United States Patent [19]
Langlois

[11] Patent Number: 5,322,099
[45] Date of Patent: Jun. 21, 1994

[54] APPARATUS FOR PREVENTING FUEL SPILLAGE

[75] Inventor: Joseph R. Langlois, Coral Springs, Fla.

[73] Assignee: L N G & K, Inc., Ft. Lauderdale, Fla.

[21] Appl. No.: 910,619

[22] Filed: Jul. 8, 1992

[51] Int. Cl.⁵ .......................... B63B 17/00; B67D 5/06
[52] U.S. Cl. ........................................ 141/307; 141/44; 141/59; 141/98; 141/86; 220/86.2; 220/746; 114/343; 137/202; 137/587
[58] Field of Search ................ 141/301, 304, 305, 307, 141/44–46, 52, 53, 59, 86, 88, 98, 297, 302, 308, 325, 326, 331; 137/572, 587, 199–202; 220/86.2, 746; 114/343

[56] References Cited

U.S. PATENT DOCUMENTS

| | | | |
|---|---|---|---|
| 2,130,059 | 9/1938 | Bosh et al. | 141/301 X |
| 2,544,820 | 3/1951 | Baker et al. | |
| 2,902,062 | 9/1959 | Smekal | 141/331 X |
| 3,037,333 | 1/1963 | Cherrington | 137/202 |
| 3,125,135 | 3/1964 | Boyer et al. | 141/290 |
| 3,351,318 | 11/1967 | Jones | 251/188 |
| 3,409,040 | 11/1968 | Weston et al. | 137/572 |
| 3,687,335 | 8/1972 | Hunter | 220/746 |
| 3,857,350 | 12/1974 | Rohan | 137/551 |
| 3,903,942 | 9/1975 | Vest | 141/301 |
| 3,915,184 | 10/1975 | Galles | 220/746 X |
| 4,552,175 | 11/1985 | Schiemann | 137/587 X |
| 4,724,861 | 2/1988 | Covert et al. | 137/202 |
| 4,917,145 | 4/1990 | Wawra et al. | 137/493 |
| 4,986,436 | 1/1991 | Bambacigno et al. | 220/86.2 |
| 5,033,521 | 7/1991 | Martin | 141/88 X |
| 5,065,782 | 11/1991 | Szlaga | 137/39 |
| 5,070,806 | 12/1991 | Coster | 114/343 |
| 5,103,877 | 4/1992 | Sherwood et al. | 141/59 |
| 5,195,567 | 3/1993 | Tyree, Jr. | 141/331 |

OTHER PUBLICATIONS

Literature from Parker Hannifin Corporation Illustrating Fuel/Air Separator, Feb. 1991 (6 pages).

*Primary Examiner*—J. Casimer Jacyna
*Attorney, Agent, or Firm*—McCormick, Paulding & Huber

[57] ABSTRACT

An apparatus is provided for preventing the spillage of fuel into the water or onto a marine vessel when filling a fuel tank on the vessel. A vent line is coupled between the fuel tank and a vent port of the vessel, at least one valve assembly is coupled within the vent line, and an overflow container is coupled within the vent line between the valve assembly and the vent port. The valve assembly defines a drain hole for permitting small quantities of fuel, gases and/or vapors to pass through the valve assembly and into the overflow container. A fill container defines a first aperture for receiving a fuel nozzle to fill the fuel tank with fuel, a fitting portion for seating the fill container within a fuel fitting coupled to the fuel tank on the vessel, and a second aperture for permitting fuel to pass between the fill container and the fuel tank. Upon filling the fuel tank with fuel, the overflow fuel is collected within the fill container, thus signalling to the attendant to turn off the fuel nozzle. The pressure differential caused by the overflow fuel within the fill container causes fuel to slowly pass through the drain hole in the valve assembly and into the overflow container, which in turn permits the overflow fuel in the fill container to drain into the fuel tank. The empty fill container is then removed from the vessel and the fuel fitting is closed without spilling any of the overflow fuel.

21 Claims, 3 Drawing Sheets

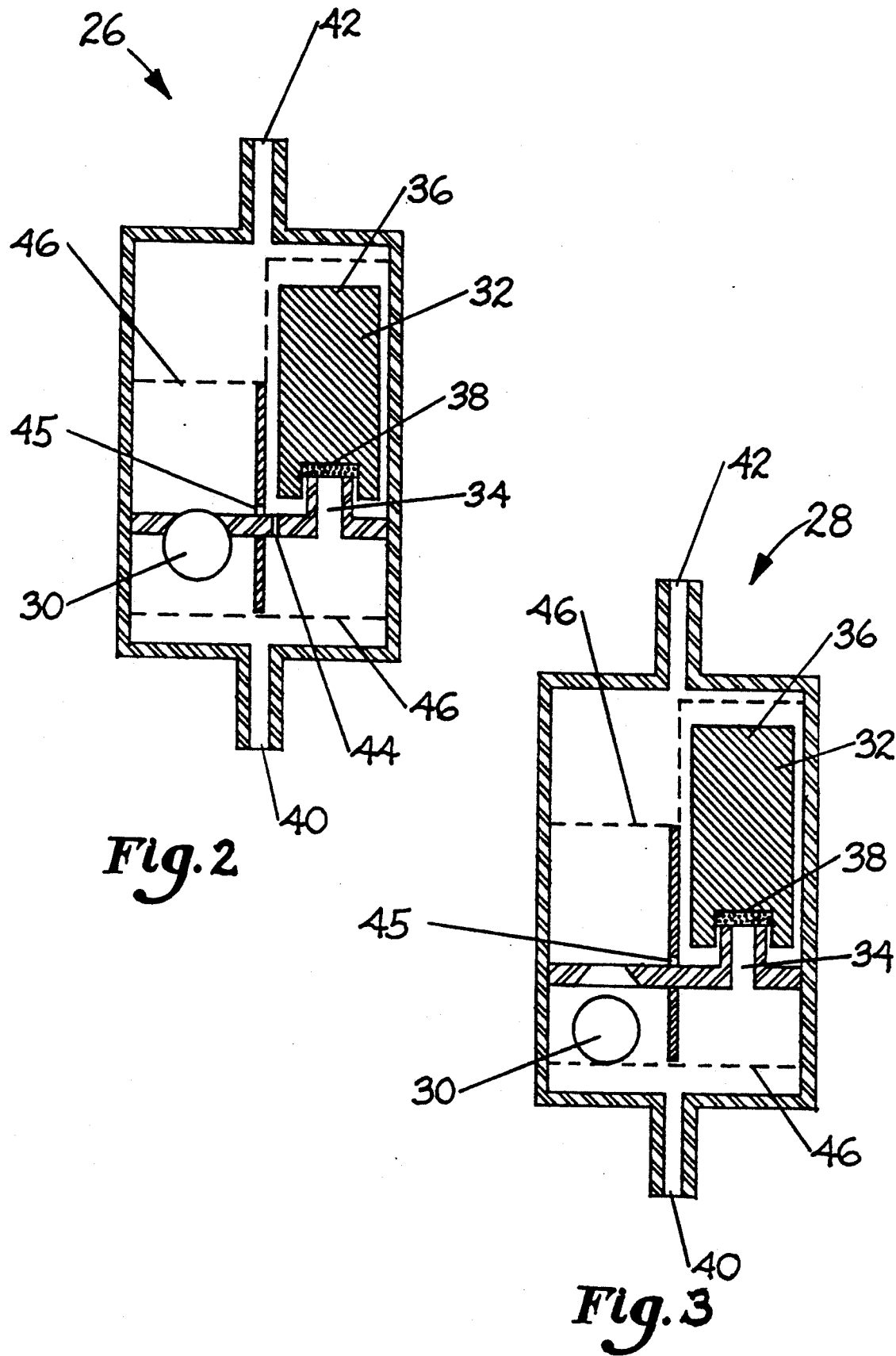

APPARATUS FOR PREVENTING FUEL SPILLAGE

FIELD OF THE INVENTION

The present invention relates to fuel systems and, more particularly, to apparatus for preventing spillage from fuel systems, such as fuel systems on marine vessels.

BACKGROUND INFORMATION

A typical vessel with an inboard fuel tank has a fuel port located on the deck, which is coupled by a fuel inlet line to the fuel tank (below deck) for filling the tank with fuel. At least one vent line is also typically coupled on one end to the fuel tank and coupled on the other end to a vent port, which is located below deck but above the water line of the vessel. The vent port is provided to permit fuel vapors to escape from the fuel tank and also to permit any excess fuel (e.g., when filling the fuel tank, when there is thermal expansion of the fuel, or agitation of the fuel in rough seas) to flow out of the tank. When filling such prior systems with fuel, the attendant typically determines when the tank is full by watching the vent port to see when the fuel begins to flow through the vent port into the water. This is a major cause of water pollution in marinas.

It is an object of the present invention to overcome the drawbacks and disadvantages of prior fuel systems.

SUMMARY OF THE INVENTION

The present invention is directed to an apparatus for preventing fuel spillage on a marine vessel. The apparatus comprises a vent line coupled between a fuel tank and a vent port of the vessel, and at least one valve assembly coupled within the vent line for preventing an overflow of fuel from the fuel tank from passing through the vent port into the water. A vent container is coupled between the valve assembly and the vent port of the vessel for collecting any fuel and/or vapors passing through the valve assembly. The apparatus further comprises a fill container defining a first aperture for receiving a fuel nozzle to fill the fuel tank with fuel, a fitting portion for seating the fill container within a fuel fitting coupled to the fuel tank on the vessel, and a second aperture for permitting fuel to pass between the fill container and the fuel tank.

The valve assembly preferably includes a first valve member for closing the valve assembly in response to the flow of fuel into the valve assembly. In the preferred embodiment of the present invention, the first valve member is a ball valve. The valve assembly preferably also includes a second valve member for opening the valve assembly in response to the pressure on the inlet side of the valve assembly exceeding a threshold value. In the preferred embodiment of the present invention, the second valve member is a pressure-relief valve. The pressure-relief valve preferably includes a valve seat and a weighted member coupled to the valve seat, the weighted member being lifted away from the valve seat in response to the pressure on the inlet side of the valve assembly exceeding the threshold value. The valve assembly also preferably defines a drain hole for permitting the passage of fuel, gases, and vapors through the valve assembly.

In the preferred embodiment of the present invention, the apparatus comprises two valve assemblies, the first valve assembly being coupled between the fuel tank and the vent container, and the second valve assembly being coupled between the vent container and the vent port.

In the preferred embodiment of the present invention, the apparatus further comprises a fill tube seated within the first aperture of the fill container and extending into the interior of the fill container for receiving the nozzle to fill the fuel tank with fuel. The fill tube preferably includes a plurality of apertures for permitting the passage of fuel, vapors and gases between the fill tube and the interior of the fill container. The apparatus of the present invention preferably further comprises a fill plug for seating within the second aperture of the fill container, to close the second aperture and remove the fill container from the vessel without spilling any fuel. The first aperture is preferably dimensioned to permit the fill plug to be passed therethrough to seat the fill plug within the second aperture. In the preferred embodiment of the present invention, the fill plug includes a liquid-displacement portion which projects into the fuel fitting upon seating the fill plug within the second aperture. The liquid-displacement portion displaces the fuel in the top of the fuel fitting into the fill container to further prevent the spillage of fuel upon removal of the fill container.

One advantage of the apparatus of the present invention, is that the valve assembly prevents any overflow fuel from the fuel tank from spilling through the vent port into the water. Rather, once the fuel tank is filled, the overflow fuel flows into the fill container, signalling to the attendant to turn off the nozzle. The drain hole in the valve assembly then permits the excess fuel to slowly pass through the valve assembly and into the vent container, which in turn permits the overflow fuel in the fill container to drain into the fuel tank. The attendant can then simply remove the empty fill container and close the fuel fitting without spilling any fuel.

If for some reason the drain hole in the valve assembly becomes blocked, or the excess fuel is not otherwise permitted to pass through the valve assembly into the vent container, then the second aperture on the fill container is closed, preferably with the fill plug, and the fill container with the overflow fuel is removed from the vessel. Thus, with the apparatus of the present invention, a fuel tank can be filled on any type of vessel without spilling the fuel either into the water or onto the vessel. The apparatus of the present invention also prevents spillage of fuel when there is thermal expansion or agitation of the fuel in rough seas.

Other advantages of the apparatus of the present invention will become apparent in view of the following detailed description and accompanying drawings.

BRIEF DESCRIPTION OF THE DRAWINGS

FIG. 2 is a cross-sectional view of the lower valve assembly of the apparatus of FIG. 1.

FIG. 3 is a cross-sectional view of the upper valve assembly of the apparatus of FIG. 1.

DETAILED DESCRIPTION

Figure 1:
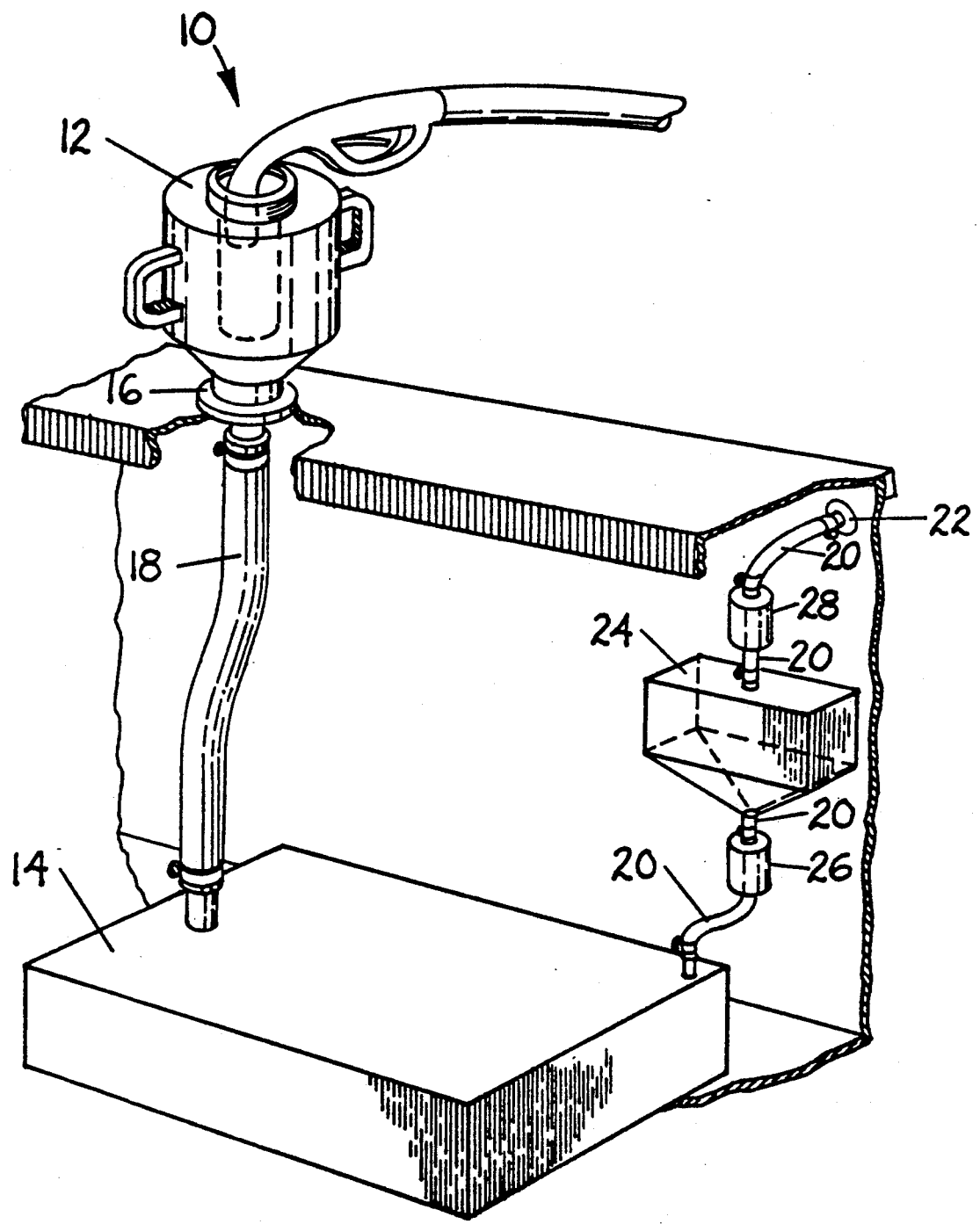
FIG. 1 is a perspective view of an apparatus embodying the present invention for preventing the spillage of fuel from a marine vessel.

In FIG. 1, an apparatus embodying the present invention is indicated generally by the reference numeral 10. The apparatus 10 includes a fill container 12, which is provided for collecting any excess fuel when filling a fuel tank 14 of the vessel. The fill container 12 is seated within a fuel fitting 16 located on the vessel, which is coupled by a fill hose 18 to the fuel tank 14. A vent hose 20 is coupled on one end to the fuel tank 14 and coupled on the other end to a vent port 22, which is located in the side of the vessel above the water line. A vent container 24, lower valve assembly 26, and upper valve assembly 28 are coupled within the vent line 20 for preventing any fuel from escaping through the vent line and into the water, as is described further below. It is noted that although the apparatus of the present invention is described with reference to a fuel system on a marine vessel, it is equally adaptable for use with other types of fuel systems for preventing spillage, such as underground fuel tanks.

The lower valve assembly 26 is illustrated in further detail in FIG. 2, and is provided to prevent any significant flow of fuel into the vent container 24. The valve assembly 26 includes two channels, one channel includes a ball valve 30 and the other channel includes a pressure-relief valve 32. The pressure-relief valve 32 includes a valve seat 34, a weighted member 36 defining a recess for receiving the valve seat 34, and a gasket 38 located within the recess. The lower valve assembly 26 also includes an inlet port 40, an outlet port 42, a first drain hole 44 located next to the pressure-relief valve 32, and a second drain hole 45 formed within the wall between the ball valve 30 and the pressure-relief valve 32. The drain holes are provided to permit small quantities of fuel, gases and vapors to flow through the valve assembly when the valve assembly is closed.

In the normally closed position of the pressure-relief valve 32, as shown in FIG. 2, the weighted member 36 and gasket 38 are seated against the valve seat 34, thus closing the valve. The weighted member 36 is indexed to permit the opening of the pressure-relief valve 32 when the pressure on the inlet port 40 exceeds the pressure on the outlet port 42 by a threshold quantity. In the embodiment of the present invention illustrated, this threshold is approximately 2.5 to 3 psi. As will be recognized by those skilled in the art, this pressure setting may vary depending upon the particular fuel system.

When fuel flows from the fuel tank 14 into the inlet port 40, the ball valve 30 is closed, thus closing the valve assembly 26, and permitting the fuel, gases and/or vapors to slowly pass only through the first drain hole 44 and second drain hole 45 into the vent container 24. Only if the pressure on the inlet side of the valve assembly 26 exceeds 2.5 psi (or other threshold setting), does the pressure-relief valve 32 open and permit the fuel and/or vapors to flow freely from the fuel tank 14 into the vent container 24. As also shown in FIG. 2, the valve assembly 26 includes screens 46 on either side of the ball valve 30 and pressure-relief valve 32 to prevent debris from interfering with the operation of the valves.

In FIG. 3, the upper valve assembly 28 is illustrated in further detail. The upper valve assembly 28 is essentially the same as the lower valve assembly 26, except that the valve assembly 28 does not include a drain hole 44. The same reference numerals are therefore used to indicate the components of the upper valve assembly 28 corresponding to the same components of the lower valve assembly 26. The upper valve assembly 28 is provided as a safety back-up valve. If the overflow of fuel does reach the upper valve assembly 28, the upper ball valve 30 closes and prevents the fuel from flowing through the vent port 22 and into the water. Only excessive over-pressure (e.g., greater than 2.5 psi, or other pressure-relief setting) will open the upper pressure-relief valve 32.

Figure 4:
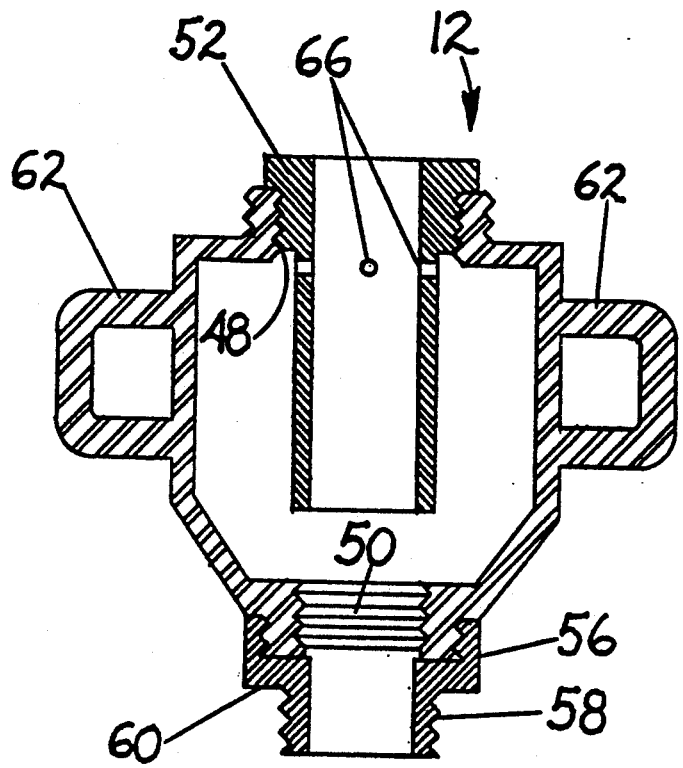
FIG. 4 is a cross-sectional view of the fill container of the apparatus of FIG. 1 illustrating the fill tube mounted within the container for receiving a fuel nozzle to fill the fuel tank with fuel.
Figure 5:
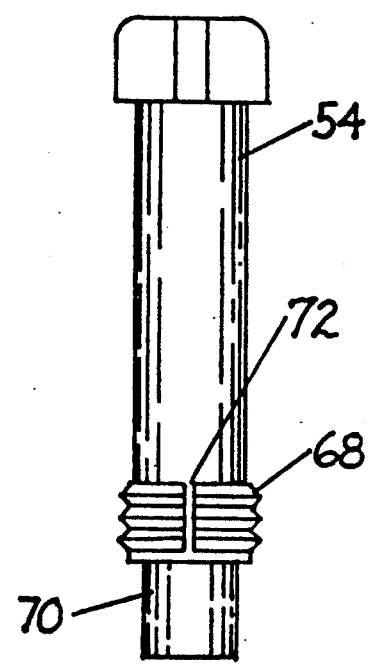
FIG. 5 is an elevation of the fill plug of the apparatus of FIG. 1.
Figure 6:
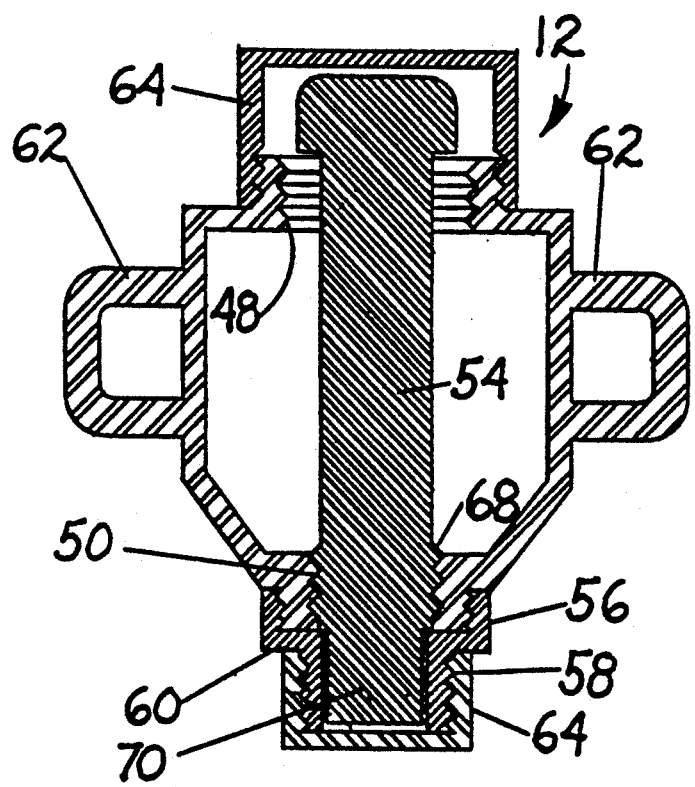
FIG. 6 is a cross-sectional view of the fill container of the apparatus of FIG. 1 illustrating the fill plug seated within the bottom of the fill container to seal the container.

Turning to FIG. 4, the fill container 12 is shown in further detail, and defines a first threaded aperture 48 on one end of the container, and a second threaded aperture 50 on the other end of the container. The first threaded aperture 48 is provided to receive a fill tube 52, and the second threaded aperture 50 is provided to receive a fill plug 54, as shown in FIGS. 5 and 6. The bottom side of the fill container 12 includes a fuel-fitting adapter 56, which includes a male-fitting portion 58 shaped to be seated within the fuel fitting 16 on the vessel. A gasket member 60 is seated around the male-fitting member 58 to seal the interface between the fuel-fill adapter 56 and the fuel fitting 16 on the vessel. The male-fitting member 58 may be threaded as shown in FIG. 4, if there are corresponding female threads on the fuel fitting 16 of the vessel. A pair of handles 62 are provided on the sides of the fill container 12, and a pair of end caps 64 are provided for closing the open ends of the fill container 12 when not in use, as shown in FIG. 6.

When filling the fuel tank 14, the end caps 64 are removed, the fill tube 52 is threaded into the first threaded aperture 48, as shown in FIG. and the male fitting 64 is seated within the fuel fitting 16 on the vessel, as shown in FIG. 1. The attendant can use the handles 62 to rotate the male fitting 58 of the fill container 12 into the fuel fitting 16 to securely seat the fill container in place. The attendant then inserts the nozzle into the fill tube 52 and begins to pump the fuel, as shown in FIG. 1. When the fuel tank 14 becomes full, the fuel then flows into the vent line 20 and inlet port 40 of the lower valve assembly 26, and in turn closes the ball valve 30. Both the pressure-relief valve 32 and ball valve 30 are then closed, permitting the fuel to slowly pass only through the drain hole 44, and in turn through the drain hole 45 and into the vent container 24. Because the system is being filled with fuel relatively rapidly (typically about 30 gallons per minute) and the drain hole 44 is relatively small, the fuel then quickly backs up into the fill container 12, signalling to the attendant to turn off the nozzle.

As shown in FIG. 4, the fill tube 52 includes several spaced holes 66 to permit air to pass up through the fill tube 52 and into the fill container 12, and thus prevent any fuel from flowing directly up the fill tube and out of the container. Because of the pressure differential created by the overflow fuel in the fill container 12, fuel slowly passes through the drain hole 44 and into the vent container 24, which in turn permits the overflow fuel in the fill container 12 to drain into the fill hose 18. The attendant then simply removes the empty fill container 12 and closes the fuel fitting 16 without spilling any fuel.

The pressure-relief valve 32 typically does not lift because the pressure at any point in an open system (i.e., with the fuel fitting 16 open) is based on the difference in height between the level of fuel in the fill container 12 and the point in the system. The pressure-relief setting of the valve 32 (and/or the installation height of the valve 32) is selected so that the pressure at the valve 32 is normally significantly below the pressure-relief setting (e.g., 2.5 to 3 psi) when the fill container 12 is partially filled with fuel. If, however, the pressure within the system exceeds the threshold pressure of the pressure-relief valve 32, the valve opens and the fuel is permitted to flow into the vent container 24. The upper valve assembly 28 then prevents the fuel from flowing beyond the vent container 24, unless the pressure within the vent container exceeds the pressure setting of the upper pressure-relief valve 32.

If for some reason the overflow fuel does not drain from the fill container 12 into the system (e.g., if the drain hole 44 becomes blocked), then the attendant removes the fill tube 52 from the fill container 12, and inserts the fill plug 54 into the second threaded aperture 50 on the bottom of the fill container 12, as shown in FIGS. 5 and 6. The threaded plug 54 includes a threaded portion 68, which is screwed into the threaded aperture 50 to seal the bottom of the fill container 12. The fill container 12 can then be removed from the fuel fitting 16 without spilling any of the fuel. As also shown in FIGS. 5 and 6, the fill plug 54 includes a liquid-displacement portion 70 located below the threaded portion 68, which is provided to displace some of the fuel within the fuel fitting 16 into the fill container 12 when the fill plug 54 is inserted. Several channels 72 are formed within the threaded portion 68 to facilitate the flow of fuel from the fuel fitting into the fill container. Thus, when the fill container 12 is removed from the vessel, the fuel level within the fuel fitting 16 will be below the top of the fuel fitting, thus further preventing the spillage of fuel if the vessel is rocked before the fuel fitting is closed.

Accordingly, a significant advantage of the apparatus of the present invention, is that the fuel tank 14 can be filled without spilling any fuel onto the vessel or into the water. The vent container and valve arrangement within the vent line also prevents any fuel from spilling into the water if there is thermal expansion of the fuel or agitation of the fuel in rough seas. As the level of fuel in the fuel tank 14 decreases, then any fuel in the vent container 24 is permitted to flow through the ball valve 30 and back into the fuel tank. The unique design of the fill container and fill plug also prevents any fuel from overflowing from the fill hose and spilling onto the vessel or into the water when the fuel tank is filled.

I claim:

1. An apparatus for preventing fuel spillage on a marine vessel, comprising:
    a vent line coupled between a fuel tank and a vent port of the vessel;
    a valve assembly coupled within the vent line for preventing an overflow of fuel from the fuel tank from passing through the vent port into the water, and defining an inlet port coupled in fluid communication with the fuel tank, an outlet port, and a first fluid passageway between the inlet and outlet ports, and including a first valve member preventing the flow of fuel through the first fluid passageway when the pressure on the inlet port is below a threshold value, and defining a second fluid passageway between the inlet and outlet ports for the flow of fuel through the valve assembly when the first valve member is preventing the flow of fuel through the first fluid passageway;
    an overflow chamber coupled between the outlet port of the valve assembly and the vent port of the vessel for collecting any fuel passing through the valve assembly; and
    a fill container defining a first aperture for receiving a fuel nozzle to fill the fuel tank with fuel, and a second aperture for coupling the fill container in fluid communication with the fuel tank to permit fuel to pass between the fill container and the fuel tank and to collect excess fuel within the fill container upon filling the fuel tank with fuel.

2. An apparatus as defined in claim 1, wherein the valve assembly defines a third fluid passageway between the inlet and outlet ports and includes a second valve member preventing the passage of fuel through the third passageway flowing in the direction from the fuel tank into the valve assembly.

3. An apparatus as defined in claim 2, wherein the second valve member is a ball valve.

4. An apparatus as defined in claim 1, wherein the first valve member is a pressure-relief valve.

5. An apparatus as defined in claim 1, comprising two valve assemblies, the first valve assembly being coupled between the fuel tank and the overflow chamber, and the second valve assembly being coupled between the overflow chamber and the vent port.

6. An apparatus as defined in claim 1, further comprising a fill tube seated within the first aperture of the fill container and extending into the interior of the fill container for receiving the nozzle to fill the fuel tank with fuel.

7. An apparatus as defined in claim 6, wherein the fill tube includes a plurality of apertures for permitting the passage of at least one of fuel, vapors and gases between the fill tube and the interior of the fill container.

8. An apparatus as defined in claim 1, further comprising a fill plug for seating within the second aperture of the fill container to close the second aperture and remove the fill container from the vessel and prevent the spillage of fuel contained within the fill container.

9. An apparatus as defined in claim 8, wherein the first aperture is dimensioned to permit the fill plug to be passed therethrough to seat the fill plug within the second aperture.

10. An apparatus as defined in claim 8, wherein the fill plug includes a liquid-displacement portion projecting through the second aperture upon seating the fill plug within the second aperture to displace the fuel within the second aperture into the fill container and further prevent the spillage of fuel upon removal of the fill container.

11. An apparatus for preventing fuel spillage on a marine vessel, comprising:
    a vent line coupled between a fuel tank and a vent port of the vessel;
    at least one valve assembly coupled within the vent line for preventing an overflow of fuel from the fuel tank from passing through the vent port into the water, and including a first valve member for closing the valve assembly in response to the flow of fuel into the valve assembly, and a second valve member in the form of a pressure relief valve for opening the valve assembly in response to the pressure on the inlet side of the valve assembly exceeding a threshold value, wherein the pressure-relief valve includes a valve seat and a weighted member coupled to the valve seat, the weighted member being lifted away from the valve seat in response to the pressure on the inlet side of the valve assembly exceeding the threshold value;

an overflow container coupled between the at least one valve assembly and the vent port of the vessel for collecting any fuel passing through the valve assembly; and a fill container defining a first aperture for receiving a fuel nozzle to fill the fuel tank with fuel, a fitting portion for coupling the fill container to the fuel tank on the vessel, and a second aperture for permitting fuel to pass between the fill container and the fuel tank for collecting any excess fuel within the fill container upon filling the fuel tank with fuel.

12. An apparatus for preventing the spillage of fuel on a marine vessel, comprising:

a fill container including an inlet port for receiving a fuel nozzle and an outlet port adapted for coupling the fill container with a fuel tank on the vessel for filling the fuel tank with fuel and for collecting overflow fuel upon filling the fuel tank with fuel;

a vent chamber coupled in fluid communication between the fuel tank and a vent port on the vessel; and a valve assembly defining an inlet port coupled in fluid communication with the fuel tank, an outlet port coupled in fluid communication with the vent chamber, and a first fluid passageway coupled in fluid communication with the inlet and outlet ports, and including first means for preventing the passage of fuel through the first fluid passageway when the pressure on the inlet port is below a threshold value, and second means for permitting the passage of fuel through the valve assembly into the vent chamber when the first means is preventing the passage of fuel through the first passageway to drain overflow fuel into the vent chamber.

13. An apparatus as defined in claim 12, wherein the valve assembly defines a second fluid passageway coupled in fluid communication with the inlet and outlet ports of the valve assembly for permitting the drainage of fuel from the vent chamber into the fuel tank, and including third means for preventing the passage of fuel through the second fluid passageway flowing in the direction from the fuel tank toward the valve assembly.

14. An apparatus as defined in claim 12, wherein the first means includes a second valve member for opening the first fluid passageway in response to the pressure on the inlet side of the valve assembly exceeding a threshold value.

15. An apparatus as defined in claim 12, wherein the second means includes a drain hole defined within the valve assembly.

16. An apparatus as defined in claim 12, further comprising another valve assembly coupled between the vent container and the vent port for preventing the passage of fuel from the vent container through the vent port.

17. An apparatus as defined in claim 16, wherein the other valve assembly includes a pressure-relief valve for opening the valve assembly in response to the pressure within the vent container exceeding a threshold value.

18. An apparatus for preventing spillage of fuel on a marine vessel, comprising:

a vent chamber coupled in fluid communication between a fuel tank and a vent port of the vessel;

a valve assembly coupled between the fuel tank and the vent chamber, including an inlet port and an outlet port, and defining a first fluid passageway in fluid communication with the inlet and outlet ports, and including a first valve member for preventing the flow of fluid through the first fluid passageway in the direction from the fuel tank toward the vent chamber, and defining a second fluid passageway in fluid communication with the inlet and outlet ports for permitting the flow of fluid through the valve assembly in the direction from the fuel tank toward the vent chamber; and a fill container defining a first port for receiving a fill nozzle, and a second port adapted for coupling the fill container in fluid communication with the fuel tank, wherein the second port permits the passage of overflow fuel into the fill container upon filling the fuel tank with fuel, and the second fluid passageway in the valve assembly directs overflow fuel from the fuel tank into the vent chamber, and in turn permits fuel within the fill container to drain through the second port toward the fuel tank.

19. An apparatus as defined in claim 18, wherein the fill container is mounted on the vessel at a higher level than the level of the valve assembly.

20. An apparatus as defined in claim 18, wherein the valve assembly further defines a third fluid passageway extending through the valve assembly, and a second valve member for preventing the flow of fluid through the third fluid passageway in the direction from the fuel tank toward the vent chamber when the pressure on the inlet port of the valve assembly is below a threshold value.

21. An apparatus as defined in claim 18, further comprising a second valve assembly coupled between the vent port and the vent chamber, and including a pressure-relief valve for preventing the flow of fluids through the valve assembly in the direction from the vent chamber to the vent port when the pressure in the vent chamber is below a threshold value. another valve assembly coupled between the vent container and the vent port for preventing the passage of fuel from the vent container through the vent port. 19. An apparatus as defined in claim 18, wherein the other valve assembly includes a pressure-relief valve for opening the valve assembly in response to the pressure within the vent container exceeding a threshold value.

* * * * *